(12) United States Patent
Zhang et al.

(10) Patent No.: US 8,285,853 B2
(45) Date of Patent: Oct. 9, 2012

(54) MESSAGE AND SYSTEM FOR IMPLEMENTING THE INTER-ACCESS OF STACK MEMBERS

(75) Inventors: Lei Zhang, Shenzhen (CN); Wei Meng, Shenzhen (CN); Lihui Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 240 days.

(21) Appl. No.: 12/743,360

(22) PCT Filed: Dec. 29, 2007

(86) PCT No.: PCT/CN2007/003981
§ 371 (c)(1),
(2), (4) Date: May 17, 2010

(87) PCT Pub. No.: WO2009/065269
PCT Pub. Date: May 28, 2009

(65) Prior Publication Data
US 2010/0263042 A1    Oct. 14, 2010

(30) Foreign Application Priority Data
Nov. 20, 2007   (CN) .......................... 2007 1 0177747

(51) Int. Cl.
*G06F 15/16* (2006.01)
*G06F 15/173* (2006.01)

(52) U.S. Cl. ......... 709/227; 709/223; 709/225; 709/228

(58) Field of Classification Search .................. 711/132, 711/169; 709/227
See application file for complete search history.

(56) References Cited

U.S. PATENT DOCUMENTS

| 6,148,376 A * | 11/2000 | Claassen ........................ 711/132 |
| 2008/0282050 A1* | 11/2008 | Grabner ........................ 711/169 |
| 2008/0282051 A1* | 11/2008 | Grabner ........................ 711/169 |

FOREIGN PATENT DOCUMENTS

| CN | 1437358 | 8/2003 |
| CN | 1441569 | 9/2003 |
| CN | 1741492 | 3/2006 |

OTHER PUBLICATIONS

PCT; International Search Report for PCT/CN2007/003981; Sep. 4, 2008.

* cited by examiner

*Primary Examiner* — Quang N. Nguyen
(74) *Attorney, Agent, or Firm* — Knobbe Martens Olson & Bear LLP

(57) ABSTRACT

The present invention discloses a method and system for implementing the inter-access of stack members. Wherein, the method includes: a stack control module assigning stack device numbers and fixed IP addresses for stack members; after a user logs on a stack member, performing a session command for accessing a destination stack member, and initiating an access request to the destination stack member based on the stack device number of the destination stack member; the stack member on which the user logs obtaining the IP address of the destination stack member based on the stack device number in the session command, and forwarding the access request to the destination stack member in the TELNET manner based on the IP address of the destination stack member; after receiving the access request, the destination stack member, as a TELNET server end, assigning a terminal number for the stack member on which the user logs, and informing an operation and maintenance management module of the destination stack member; the operation and maintenance management module sending operation echo information of the destination stack member back to the stack member on which the user logs.

19 Claims, 3 Drawing Sheets

MESSAGE AND SYSTEM FOR IMPLEMENTING THE INTER-ACCESS OF STACK MEMBERS

CROSS-REFERENCE TO RELATED APPLICATIONS

This application is the U.S. National Phase application under 35 U.S.C. §371 of International Application PCT/CN2007/003981 filed Dec. 29, 2007, which claims priority to Chinese Application 200710177747.4 filed Nov. 20, 2007. The entirety of the two of these applications is hereby incorporated by reference.

FIELD OF THE INVENTION

The present invention relates to data communication field, in particular to a method and system for implementing the inter-access of stack members.

BACKGROUND OF THE INVENTION

Flexible stack is a technology for providing users with a plurality of data communication devices as a whole device, hereinafter referred to as stack. A stack system comprises a plurality of stack member devices; stack member devices are connected with each other by stack communication interfaces, and the stack communication interfaces are high speed HiGig (10-Gbps high speed port) interfaces. The stack system classifies all devices contained in the system into main device, backup device and member device, wherein there are only one main device, one backup device and there can be a plurality of member devices. In a complicated stack system, there often exist tens of devices.

At present, the management scheme for each device in a stack system in the prior art is: each stack member device provides to exterior an access control port which can be serial port type or an Ethernet type, and the access or logon mode may employ a low speed serial port or TELNET (TELecommunication NETwork, a standard protocol and major approach for Internet remote logon service), SSH (Secure Shell, a secure protocol based on application layer and transport layer). Users generally device-wise access and configure each device of the stack system, but this kind of management appears to be very complex.

If the management on the entire stack system can be achieved by logging on one device, the management will become very convenient and fast to the users, however, it can not be realized till now.

SUMMARY OF THE INVENTION

The present invention provides a method and system for implementing the inter-access of stack members, so as to solve the problem of the complexity of the configuration management resulted from various management tools logging from various devices.

The method for implementing the inter-access of stack members according to the present invention comprises:

Step 1, a stack control module assigning stack device numbers and fixed IP addresses for stack members;

Step 2, after a user logs on a stack member, performing a session command for accessing a destination stack member, and initiating an access request to the destination stack member based on the stack device number of the destination stack member;

Step 3, the stack member on which the user logs obtaining the IP address of the destination stack member based on the stack device number in the session command, and forwarding the access request to the destination stack member in the TELNET manner based on the IP address of the destination stack member;

Step 4, after receiving the access request, the destination stack member, as a TELNET server end, assigning a terminal number for the stack member on which the user logs, and informing an operation and maintenance management module of the destination stack member;

Step 5, the operation and maintenance management module sending operation echo information of the destination stack member back to the stack member on which the user logs.

Wherein, Step 3 comprises,

Step 31, the stack member on which the user logs acquiring, from an interface function, the IP address of the destination stack member corresponding to the stack device number of the destination stack member;

Step 32, the stack member on which the user logs acquiring a route from a virtual private network of the stack according to the IP address of the destination stack member;

Step 33, the stack member on which the user logs calling an interface function of a transport control protocol module to create a transport control protocol connection;

Step 34, the stack member on which the user logs calling an interface function of a TELNET module to create a TELNET connection structure; and Step 35, the stack member on which the user logs calling a link establishment interface function of the transport control protocol module to initiate an active link establishment of the transport control protocol.

Step 3 further comprises, Step 36, the stack member on which the user logs setting a particular flag bit of stack internal logon for the TELNET connection structure.

Wherein, Step 4 comprises:

Step 41, after receiving the access request, the destination stack member calling the TELNET interface function to turn on a port of the destination stack member;

Step 42, the destination stack member applying for a virtual type terminal connection for associating with the TELNET and the transport control protocol control structure;

Step 43, sending a request message to the operation and maintenance management module of the destination stack member;

Step 44, after receiving the request message, the operation and maintenance management module sending a prompt symbol to the destination stack member, and sending the operation echo information of the destination stack member back to the stack member on which the user logs.

The following step is comprised between Step 42 and Step 43: the destination stack member setting a flag for stack internal inter-access of a TELNET connection.

The following step is comprised between Step 41 and Step 42: judging, based on the IP address of the destination stack member, whether it is the TELNET connection of the inter-access of stack internal members; if yes, performing Steps 42-44, otherwise, performing a common TELNET process.

The system for implementing the inter-access of stack members according to the embodiment of the present invention comprises, a stack control module, configured to assign stack device numbers and fixed IP addresses for stack members;

a stack member, configured to, after executing a session command for accessing a destination stack member initiated when a user logs on, initiate an access request to the destination stack member based on the stack device number of the destination stack member, to obtain the IP address of the destination stack member based on the stack device number in the session command, and to forward the access request to the destination stack member in the TELNET manner based on the IP address of the stack member, and to act, after the destination stack member receives the access request, as a TELNET server end to assign a terminal number for the stack member on which the user logs; and an operation and maintenance management module, configured to send, in response to an operating command of user side, operation echo information of the destination stack member back to the stack member on which the user logs.

Wherein, the stack member on which the user logs is configured to acquire, from an interface function, the IP address of the destination stack member corresponding to the stack device number of the destination stack member;

acquire a route from the a virtual private network of the stack according to the IP address of the destination stack member;

call an interface function of a transport control protocol module to create a transport control protocol connection;

call an interface function of a TELNET module to create a TELNET connection structure; and call a link establishment interface function of the transport control protocol module to initiate an active link establishment of the transport control protocol.

The stack member on which the user logs is further configured to set a particular flag bit of stack internal logon for the TELNET structure.

Wherein, the destination stack member is configured to call the TELNET interface function to turn on a port of the destination stack member after receiving the access request;

apply for a virtual type terminal connection for associating with the TELNET and the transport control protocol control structure; and send a request message to the operation and maintenance management module of the destination stack member.

The operation and maintenance management module is further configured to send a prompt symbol to the destination stack member after receiving the request message.

The destination stack member is further configured to set a flag for stack internal inter-access of a TELNET connection.

The present invention overcomes the disadvantage of complex and cumbersome management in the existing stack technologies that users have to log on each stack member to perform configuration, and solves the problem of the complexity of the configuration management resulted from various management tools logging from various devices in the prior art, the whole stack system can be managed by logging on only one device, thus the efficiency of inter-access among stack members is improved, and can facilitate the users and administrators of the stack system to perform uniform management on the tens of member devices in the system.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF THE EMBODIMENTS

In the present invention, the complexity of the configuration management resulted from various management tools logging from various devices is eliminated by employing a uniform interface, which is realized by sending, by a user, a request to one of the devices via a serial port terminal or TELNET, SSH, which is parsed and then dispatched to a device, which is required to execute, for processing.

Figure 1A:
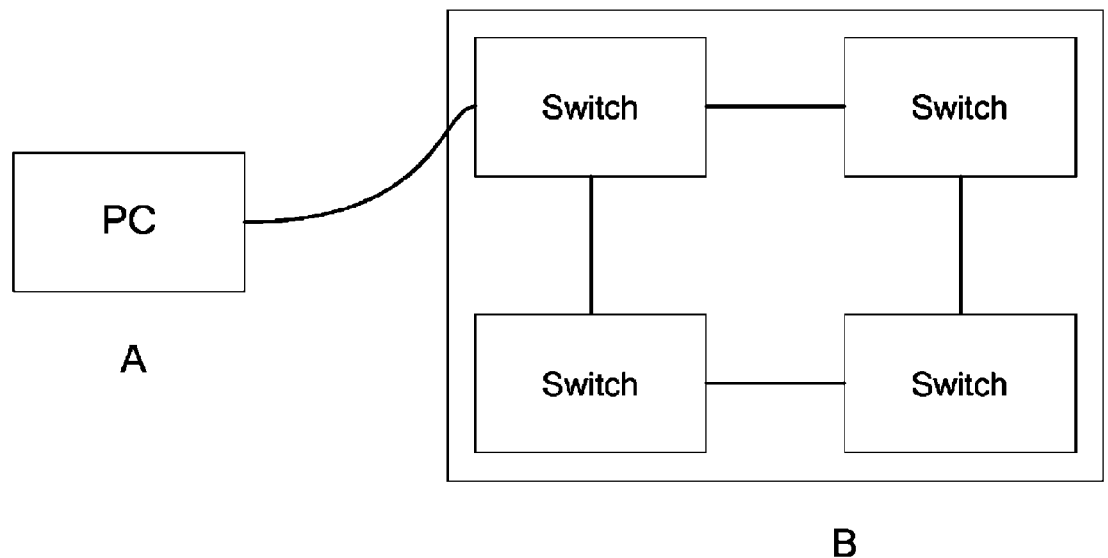
FIG. 1a is a schematic view showing the inter-access system of the stack members in the prior art.

FIG. 1a is a schematic view showing the inter-access system of the stack members in the prior art, which comprises a user side device A and a stack system B, wherein a user has to log on each device for configuration if the user configures the stack system via conventional serial port or TELNET, SSH way.

Figure 1B:
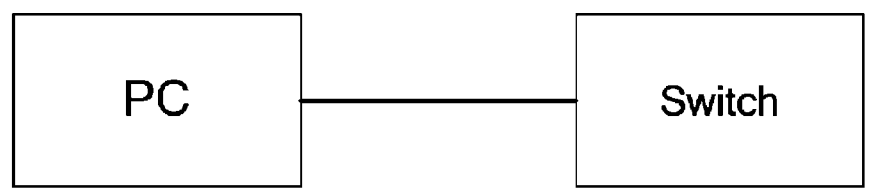
FIG. 1b is a schematic view showing the inter-access system of the stack members according to an embodiment of the present invention.

FIG. 1b is a schematic view showing the inter-access system of the stack members according to an embodiment of the present invention. As shown in FIG. 1b, the system comprises a user side device A and a stack system B, wherein the user side device A and a certain stack member device in the stack system is connected via the Ethernet, PPP (Point-to-Point Protocol) manner, or accessed via a low speed serial port manner. A user can access and log on the stack member device via a serial port, the TELNET, the SSH manner; the stack system provides a uniform management address to exterior, and the management and configuration of the whole stack system can be realized by logging on the management address; at the same time the management address is a system level address rather than an address assigned to a main device or any member device of the stack system, and it is similar to an access control port address of the prior system; the uniform IP address provided to the user for logging on and connecting can be the management IP of the stack system, or any IP address of the main/backup device interface.

The method for implementing the inter-access of stack members according to an embodiment of the present invention includes the following steps:

The first step, a stack control module assigns stack device number, stack id, for each stack member in the stack system. The firstly started device in the system automatically becomes a main device and is assigned with a device number of 1; and monitors whether there are other successful started devices via a stack communication port, the secondly started device is a backup device which request a device number to the main device after being started, and the main device assigns the backup device with a device number of 2; the thirdly started device is a member device which similarly request a device number to the main device, and the main device assigns the thirdly started device with a device number of 2, . . . , and so forth.

The second step, the stack control module of each stack member device assigns a corresponding fixed IP address according to the device number of each stack member, the IP block address of 168.2 allocated for inter-communication is used by the IP address, for example, the IP addresses assigned to the devices with the device number of 1 and 2 are respectively 168.2.3.1/24 and 168.2.3.2/24.

The third step, after the user logs on the stack member device to execute the command of session<stack id> (stack id is the device number of the destination stack device to which the user requests to access), the stack member device obtains the IP address of the destination device corresponding to the stack id from the stack control module thereof based on the parameter of stack id, and initiates a TELNET connection to the destination IP address via a stack communication port;

The fourth step, after the destination stack device receives the connection request, the destination stack device, as the TELNET server end, assigns a terminal number(the terminal number is the logon id assigned by a server end for a client end when being used for the TELNET connection) for the stack member on which the user logs, and informs an operation and maintenance management module which is a part of the stack member. The operation and maintenance management module is configured to respond to the operation command of user side, to respond to the TELNET connection to send a prompt symbol to a virtual type terminal, and to send the echo information back to the user. Wherein username and password interaction needs be particularly processed with respect to the TELNET of the stack, and does not need any re-authentication.

Whatever way is utilized by the user to log on and access the stack member device, the inter-access of the stack member devices always employs the TELNET connection manner.

The embodiments of the present invention will be described hereinafter in detail in conjunction with the drawings thereof.

The hardware of the stack system shown in FIG. 1a and FIG. 1b is comprised of several switches supporting stack function and a user side PC. Wherein, each switch has 2-4 high speed ports for connecting with other switches in the system, and the inter-access of the stack switches can be realized by message transmission via the high speed ports. The PC is connected to one access control port of the stack switches, the access control port can be a common port of the switches, by which the PC carries out TELNET, SSH connection and access; the access control port can also be a serial port of the switches, by which the PC can access the stack system in the manner of a serial port terminal.

Figure 2:
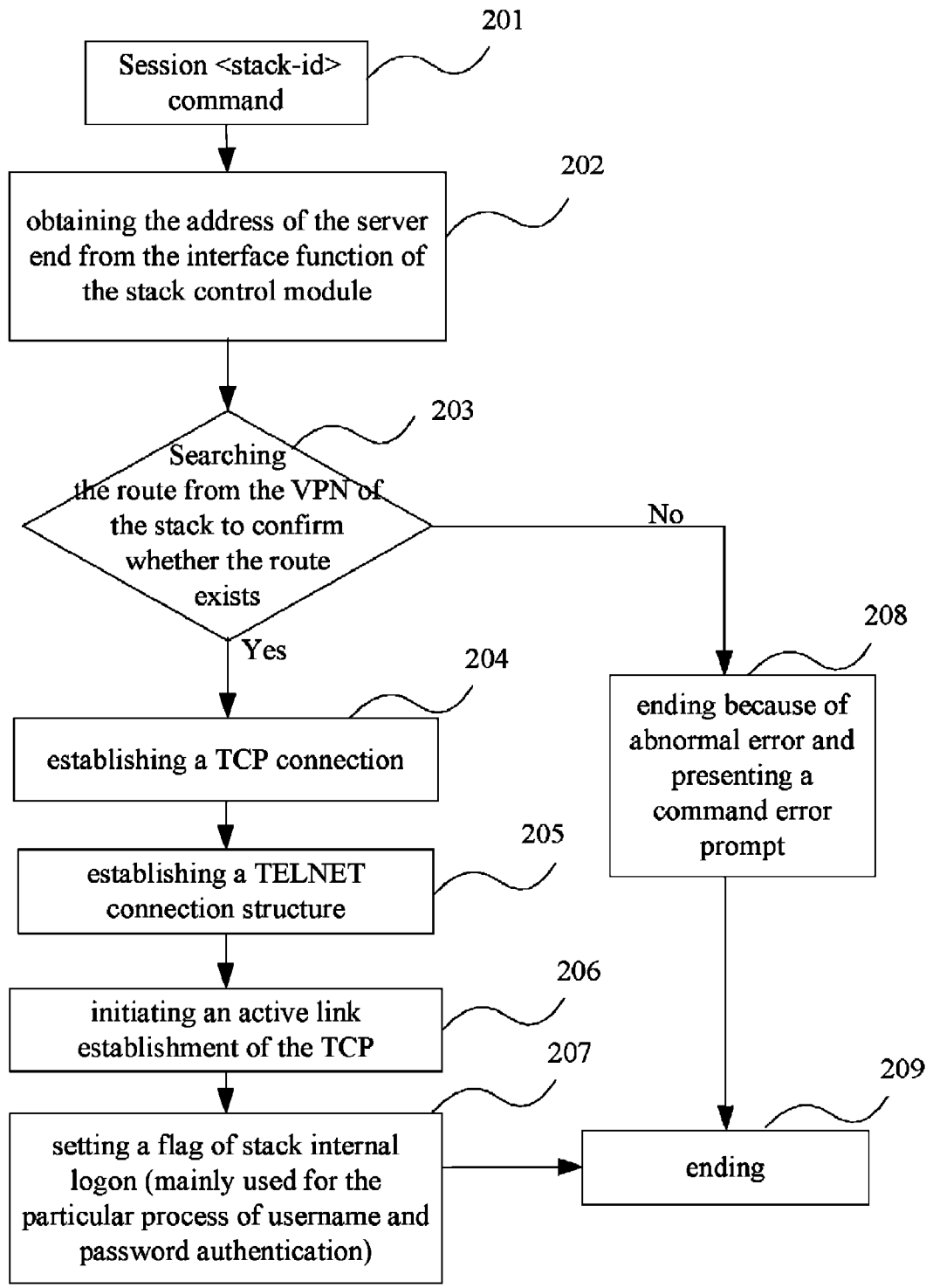
FIG. 2 is a flow chart of the process of a stack member client end initiating a session command according to an embodiment of the present invention.

As shown in FIG. 2, after the user logs on any one of the stack member devices through the client end, the process flow of initiating a session command through the client end is described using TELNET access as an example, the embodiment comprises the following steps:

Step 201, the user inputs session <device id> into one stack member device to initiate an access request to another device, wherein the parameter "device id" of the access request is the device number of the destination stack member device;

Step 202, the stack member on which the user logs obtains the IP address of the server end from the interface function of the stack control module, wherein the IP address is corresponding to device id;

Step 203, the stack member on which the user logs utilizes the IP address of the server end to search route from the VPN (Virtual Private Network) of the stack, if the route entry exists, the process goes to Step 204, or else goes to Step 208;

Step 204, the stack member on which the user logs calls the interface function of TCP (Transmission Control Protocol) module to establish a TCP connection;

Step 205, the stack member on which the user logs calls the interface function of the TELNET module to establish a TELNET connection structure;

Step 206, the stack member on which the user logs calls link establishment interface function of the TCP module to initiate an active link establishment of the TCP;

Step 207, the stack member on which the user logs sets a particular flag bit of stack internal logon for the TELNET structure, the particular flag bit of stack internal logon mainly being used for the particular process of username and password authentication;

Step 208, a command error prompt is presented and an abnormal error value is returned; Step 209, ends.

Figure 3:
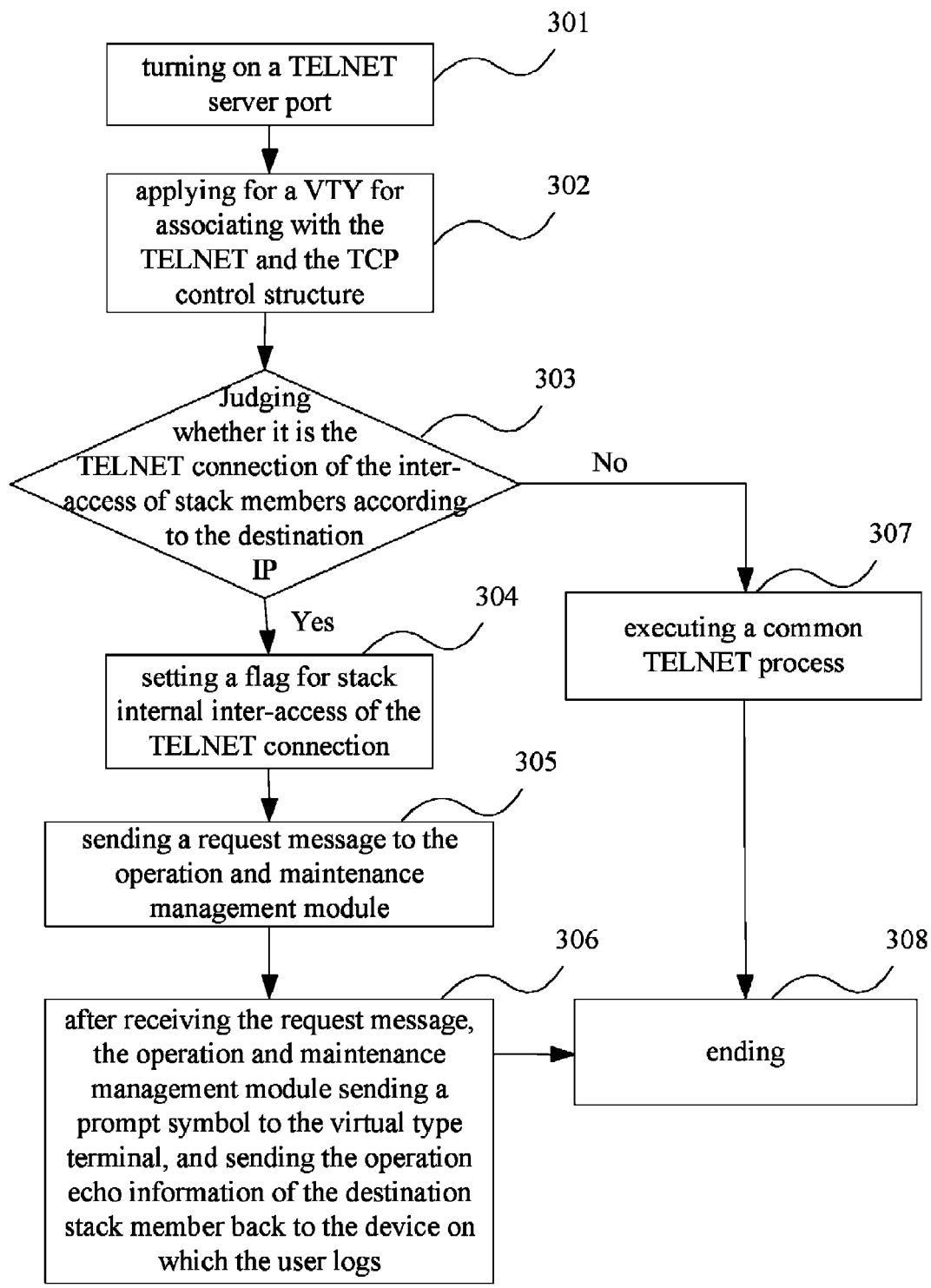
FIG. 3 is a schematic view showing the process of a stack member server end establishing inter-access TELNET connection according to an embodiment of the present invention.

As shown in FIG. 3, the process of the destination stack member, as the server end, establishing an inter-access TELNET connection comprises the following steps:

Step 301, as the TELNET server end, the stack member being accessed calls the TELNET interface function to turn on a TELNET server port;

Step 302, the destination stack member applies for a virtual type terminal (VTY) connection for associating with the TELNET and the TCP control structure;

Step 303, the destination stack member judges whether it is the TELNET connection of the inter-access of stack members based on the destination IP address; if yes, the process goes to Step 304, or else goes to Step 307;

Step 304, the destination stack member, as the server end of the TELNET, assigns a terminal number to the stack member on which the user logs, and sets a flag for stack internal inter-access of the TELNET connection;

Step 305, the destination stack member sends a request message to the operation and maintenance management module;

Step 306, after receiving the request message, the operation and maintenance management module sends a prompt symbol "prompt" to the stack member on which the user logs, and sends the operation echo information of the destination stack member back to the device on which the user logs, thus the user can read the information of the destination stack member;

Step 307, a common TELNET process is executed;
Step 308, ends.

By the technology scheme of the present invention, the internal members of a stack system can establish connection between each other via TELNET manner, thus the user can access other devices by logging on one stack member device. The user utilizes session command, wherein the device member of the destination stack member to be accessed is used as the parameter of the command, to initiate an access request, and to access the destination device inside the stack system via the TELNET connection manner. Therefore, the purpose of management simplification of the internal members of the stack system is realized.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the claims of the present invention.

What is claimed is:

1. A method for implementing the inter-access of stack members, comprising the following steps, Step a, a stack control module assigning stack device numbers and fixed IP addresses for stack members;

Step b, after a user logs on a stack member, performing a session command for accessing a destination stack member, and initiating an access request to the destination stack member based on the stack device number of the destination stack member;

Step c, the stack member on which the user logs obtaining the IP address of the destination stack member based on the stack device number in the session command, and forwarding the access request to the destination stack member in the TELNET manner based on the IP address of the destination stack member;

Step d, after receiving the access request, the destination stack member, as a TELNET server end, assigning a terminal number for the stack member on which the user logs, and informing an operation and maintenance management module of the destination stack member;

Step e, the operation and maintenance management module sending operation echo information of the destination stack member back to the stack member on which the user logs.

2. The method for implementing the inter-access of stack members according to claim 1, wherein Step c comprises the following steps,
- the stack member on which the user logs acquiring, from an interface function, the IP address of the destination stack member corresponding to the stack device number of the destination stack member;
- the stack member on which the user logs acquiring a route from a virtual private network of the stack according to the IP address of the destination stack member;
- the stack member on which the user logs calling an interface function of a transport control protocol module to create a transport control protocol connection;
- the stack member on which the user logs calling an interface function of a TELNET module to create a TELNET connection structure; and
- the stack member on which the user logs calling a link establishment interface function of the transport control protocol module to initiate an active link establishment of the transport control protocol.

3. The method for implementing the inter-access of stack members according to claim 2, wherein Step c further comprises,
- the stack member on which the user logs setting a particular flag bit of stack internal logon for the TELNET connection structure.

4. The method for implementing the inter-access of stack members according to claim 3, wherein Step d comprises the following steps,
Step da, after receiving the access request, the destination stack member calling the TELNET interface function to turn on a port of the destination stack member;
Step db, the destination stack member applying for a virtual type terminal connection for associating with the TELNET and the transport control protocol control structure;
Step dc, sending a request message to the operation and maintenance management module of the destination stack member;
Step dd, after receiving the request message, the operation and maintenance management module sending a prompt symbol to the destination stack member, and sending the operation echo information of the destination stack member back to the stack member on which the user logs.

5. The method for implementing the inter-access of stack members according to claim 4, wherein the following step is comprised between Step db and Step dc,
- the destination stack member setting a flag for stack internal inter-access of a TELNET connection.

6. The method for implementing the inter-access of stack members according to claim 5, wherein the following step is comprised between Step da and Step db,
- judging, based on the IP address of the destination stack member, whether it is the TELNET connection of the inter-access of stack internal members; if yes, performing Steps db-dd, otherwise, performing a common TELNET process.

7. The method for implementing the inter-access of stack members according to claim 2, wherein Step d comprises the following steps,
Step da, after receiving the access request, the destination stack member calling the TELNET interface function to turn on a port of the destination stack member;
Step db, the destination stack member applying for a virtual type terminal connection for associating with the TELNET and the transport control protocol control structure;
Step dc, sending a request message to the operation and maintenance management module of the destination stack member;
Step dd, after receiving the request message, the operation and maintenance management module sending a prompt symbol to the destination stack member, and sending the operation echo information of the destination stack member back to the stack member on which the user logs.

8. The method for implementing the inter-access of stack members according to claim 7, wherein the following step is comprised between Step db and Step dc,
- the destination stack member setting a flag for stack internal inter-access of a TELNET connection.

9. The method for implementing the inter-access of stack members according to claim 8, wherein the following step is comprised between Step da and Step db,
- judging, based on the IP address of the destination stack member, whether it is the TELNET connection of the inter-access of stack internal members; if yes, performing Steps db-dd, otherwise, performing a common TELNET process.

10. A system for implementing the inter-access of stack members, comprising,
- a stack control module, configured to assign stack device numbers and fixed IP addresses for stack members;
- a stack member, configured to, after executing a session command for accessing a destination stack member initiated when a user logs on, initiate an access request to the destination stack member based on the stack device number of the destination stack member, to obtain the IP address of the destination stack member based on the stack device number in the session command, and to forward the access request to the destination stack member the TELNET manner based on the IP address of the stack member, ; and to act, after the destination stack member receives the access request, as a TELNET server end to assign a terminal number for the stack member on which the user logs;
- an operation and maintenance management module, configured to send, in response to an operating command of user side, operation echo information of the destination stack member back to the stack member on which the user logs; and
- a computing system comprising a processor coupled to a memory, the computing system configured to execute the stack control module, the stack member, and the operation and maintenance module.

11. The system for implementing the inter-access of stack members according to claim 10, wherein the stack member on which the user logs is configured to
- acquire, from an interface function, the IP address of the destination stack member corresponding to the stack device number of the destination stack member;
- acquire a route from the a virtual private network of the stack according to the IP address of the destination stack member;
- call an interface function of a transport control protocol module to create a transport control protocol connection;
- call an interface function of a TELNET module to create a TELNET connection structure; and
- call a link establishment interface function of the transport control protocol module to initiate an active link establishment of the transport control protocol.

12. The system for implementing the inter-access of stack members according to claim 11, wherein the stack member on which the user logs is further configured to set a particular flag bit of stack internal logon for the TELNET structure.

13. The system for implementing the inter-access of stack members according to claim 12, wherein the destination stack member is configured to
- call the TELNET interface function to turn on a port of the destination stack member after receiving the access request;
- apply for a virtual type terminal connection for associating with the TELNET and the transport control protocol control structure; and
- send a request message to the operation and maintenance management module of the destination stack member.

14. The system for implementing the inter-access of stack members according to claim 13, wherein the operation and maintenance management module is further configured to send a prompt symbol to the destination stack member after receiving the request message.

15. The system for implementing the inter-access of stack members according to claim 13, wherein the destination stack member is further configured to set a flag for stack internal inter-access of a TELNET connection.

16. The system for implementing the inter-access of stack members according to claim 11 wherein the destination stack member is configured to
- call the TELNET interface function to turn on a port of the destination stack member after receiving the access request;
- apply for a virtual type terminal connection for associating with the TELNET and the transport control protocol control structure; and
- send a request message to the operation and maintenance management module of the destination stack member.

17. The system for implementing the inter-access of stack members according to claim 16, wherein the operation and maintenance management module is further configured to send a prompt symbol to the destination stack member after receiving the request message.

18. The system for implementing the inter-access of stack members according to claim 16, wherein the destination stack member is further configured to set a flag for stack internal inter-access of a TELNET connection.

19. Non-transitory computer storage that stores executable instructions that direct a computing system to perform a process for implementing the inter-access of stack members, the process comprising:
- assigning stack device numbers and fixed IP addresses for stack members;
- after executing a session command for accessing a destination stack member initiated when a user logs on, initiating an access request to the destination stack member based on the stack device number of the destination stack member, to obtain the IP address of the destination stack member based on the stack device number in the session command, and to forward the access request to the destination stack member the TELNET manner based on the IP address of the stack member, and to act, after the destination stack member receives the access request, as a TELNET server end to assign a terminal number for the stack member on which the user logs; and
- sending, in response to an operating command of user side, operation echo information of the destination stack member back to the stack member on which the user logs.

* * * * *